United States Patent [19]

Ashmead

[11] 4,103,003

[45] Jul. 25, 1978

[54] COMPOSITION FOR IMPROVING BIOLOGIC DEVELOPMENT

[76] Inventor: Harvey H. Ashmead, 719 E. Center St., Kaysville, Utah 84037

[21] Appl. No.: 680,078

[22] Filed: Apr. 26, 1976

Related U.S. Application Data

[63] Continuation-in-part of Ser. No. 293,268, Sep. 28, 1972, abandoned, which is a continuation-in-part of Ser. No. 872,734, Oct. 30, 1969, abandoned.

[51] Int. Cl.² ............... A61K 37/02; A61K 31/70
[52] U.S. Cl. ................................. 424/177; 424/180
[58] Field of Search ................. 424/177, 180; 99/10, 99/7

[56] References Cited

U.S. PATENT DOCUMENTS

| | | | |
|---|---|---|---|
| 1,190,953 | 7/1916 | Renshaw | 99/10 |
| 2,269,665 | 1/1942 | Herbst | 99/10 |
| 2,973,265 | 2/1961 | Gillis | 99/2 |
| 3,272,632 | 9/1966 | Speer | 99/7 |
| 3,463,858 | 8/1969 | Anderson | 424/289 |

*Primary Examiner*—Sam Rosen
*Attorney, Agent, or Firm*—M. Wayne Western

[57] ABSTRACT

A combination of a protein hydrolysate metal chelate and a sugar-metal chelate exhibit a synergistic effect on biological development in that a biological organism grows at a more rapid rate and biological tissues assimilate a substantially greater amount of essential polyvalent metals when the metals are administered in the form of an exogenically prepared composition of both hydrolyzed protein-metal and sugar-metal chelate. Unique methods of preparation of the synergistic composition include (a) forming a protein hydrolysate metal chelate and sugar-metal chelate separately and thereafter mixing the chelates; (b) hydrolyzing protein, adding metal and thereafter combining the hydrolyzed protein and metal with hydrolyzed sugar, starches or carbohydrates, the pH of the conbination being thereafter adjusted until the chelates are formed; (c) hydrolyzing protein and sugar or starch together, adding a soluble metal compound and thereafter adjusting the pH with an alkaline solution until the chelates are formed; (d) using a quicklime strong base solution to hydrolyze either the protein or the sugar or starch for use in the methods above described, and (e) making metal available for chelation by electrolytically treating ore waste products and the like.

10 Claims, No Drawings

COMPOSITION FOR IMPROVING BIOLOGIC DEVELOPMENT

BACKGROUND OF THE INVENTION

1. Field of the Invention

The invention relates to improving the development of biological tissues by the increased uptake of essential polyvalent metals, and more particularly to a synergistic composition containing said metals in a chelated form and method of preparation therefor, the composition having a significantly greater effect on development than the components of the composition chelated.

2. The Prior Art

The presently known essential polyvalent metals in animal nutrition and biological development are calcium, magnesium, zinc, iron, manganese, copper and cobalt. There is also evidence that other elements such as selenium may have significant, if not essential, influence on biological activity. The present invention contemplates the use of the mentioned metals, including selenium and other biologically important polyvalent minerals in the form of metal chelates.

The term "chelate" is stated in Webster's Seventh New Collegiate Dictionary, 1965, as being derived from the Greek chele meaning "claw" and is defined as "of relating to, or having a cyclic structure usually containing five or six atoms in a ring in which a central metallic ion is held in a coordination complex."

In connection with the above definition, metal chelates are herein defined to mean a metal atom attached by more than one donor atom of a ligand in such a manner as to form a heterocyclic ring by coordination complex. A ligand is herein defined to mean molecules of hydrolyzed protein and carbohydrates which are capable of functioning as the donor partner in one or more coordinate bonds. In other words, the ligand is electron rich and/or proton deficient. Ligands having two or more atoms which can simultaneously serve as donors are sometimes called polydentate ligands. Polydentate ligands whose structures permit the attachment of two or more donor sites to the same metal ion simultaneously, thus closing one or more heterocyclic rings, are called chelate ligands. In this specification, the terms chelate ligand an ligand will be used interchangeably an will preferably be referred to as ligand.

From the above it is apparent that a ligand must have available electrons in order to react with the metal ion to form a coordination complex or chelate. Obviously, the more acidic a solution is the more protons will interfere or compete for electrons and the less readily a chelate will form. Therefore, in the case of protein hydrolysates, i.e., polypeptides, peptides and naturally occurring amino acids the alpha amino groups ($-NH_2$) should be free from interfering protons ($NH_3^+$) and the carboxylic acid groups should have the protons removed to form carboxy ($\ominus COO\ominus$) groups. This is a situation which occurs when the pH is more basic than the isoelectric point of the particular molecule in question. While each molecule has its own isoelectric point or zwitter ionic state it is not possible to have a stated isoelectric point for a group of different molecules such as protein hydrolysates, and thus the terms must be described more functionally, i.e., the mixture must be sufficiently basic that interfering protons are removed from the protein hydrolysate ligand. The same reasoning will also apply to carbohydrate ligands whether in the form of a polysaccharide such as starch, a di- or trisaccharide, or a monosaccharide. It is to be understood that when carbohydrate or polysaccharide hydrolysis products are referred to a monosaccharide is the smallest amount meant since monosaccharides cannot be hydrolyzed to simpler sugars. See, for example, Harrow-Mazur *Textbook of Biochemistry*, Page 8, 7th Edition 1958.

According to the present invention, it has been found that minerals when administered to biological organisms in chelated form improve the growth rate and/or tissue mineral uptake in the organism. While the precise mechanisms involved and reasons therefor are not yet known with certainty, it is presently believed that improved growth and/or metal uptake result from administering the metal chelates in biologically available form. Metals are mobilized in biological organisms through the formation of metal chelates, an if the metabolism of the organism does not readily facilitate chelate formation, metal assimilation and transport may be inhibited.

Metal chelates are superior to inorganic metal compounds in facilitating metal absorption and transport because many animals or plants will have an inherent defect which inhibits natural endogenic synthesis of metal complex. When one or more metal chelates are provided, the essential or polyvalent metals are introduced into the system in a readily assimilable form and thus are immediately available to bring about metabolic stimulation.

Although the use of metal proteinates, i.e., chelates of hydrolyzed protein for increasing the essential metal content of tissues is known, for example, see copending patent application Ser. No. 739,141, filed June 24, 1968, the formation and use of a synergistic composition of at least two different metal chelates having hydrolyzed protein and carbohydrate ligands to affect biological development in surprising magnitude has heretofore been unknown.

BRIEF DESCRIPTION AND OBJECTS OF THE INVENTION

The present invention comprises unique synergistic compositions and methods for preparation of the compositions, which compositions are significantly more effective in making essential metals abundantly available to biological tissue, regardless of the endogenic synthesizing capability of the biological organism than components of the composition individually.

It is, therefore, a primary object of this invention to provide a novel composition of matter.

It is another important object of the invention to provide a novel synergistic composition of matter which has a greater effect on the development of biological organisms than components of the composition individually.

Another primary object of the present invention is to provide improved methods for preparing synergistic compositions.

These and other objects and features of the present invention will become more fully apparent from the following description and appended claims.

DETAILED DESCRIPTION

It has been found, according to the present invention, that a combination of metal chelates including chelates having (1) protein hydrolysate ligands and (2) sugar ligands have a surprisingly greater effect on the growth and development of biological organisms than either chelate alone. This phenomenon is referred to in the art as synergism. In this specification, the term synergistic composition means a composition of two or more compounds having a greater effect on the development of a biological organism than any one of the components individually. A metal chelate having protein hydrolysate and/or naturally occurring amino acid ligands is defined herein as a hydrolyzed protein-metal chelate or metal proteinate. A metal chelate having ligands of sugar, starch or carbohydrate is defined herein as a sugar-metal chelate.

Generally speaking, a synergistic composition, according to the present invention, is prepared by forming protein and sugar hydrolysates either separately or together, combining the hydrolysates with soluble compounds of biologically important polyvalent metals, and adjusting the pH with a base until chelates, i.e., coordination complexes are formed. Protein hydrolysates, in this specification, means the products of hydrolysis of protein, whether the hydrolysis is effected with acid or base. Protein hydrolysate refers to polypeptides, peptides and naturally occurring amino acids. Simiarly, sugar hydrolysates means the products of hydrolysis of sugars and, also, the carbon containing products of hydrolysis of carbohydrates such as starch and mono-, di-, and polysaccharides, whether the hydrolysis is effected with acid or base. The term carbohydrate, in this specification, means all polyhydroxy carbonyl compounds containing hydrogen and oxygen in the proportion 2:1. The term simple sugar in this specification is defined to mean aldotriose $CHO-(CHOH)-CH_2OH$, aldotetrose $CHO-(CHOH)_2-CH_2OH$, aldopentoses with the general formula $CHO-(CHOH)_3-CH_2OH$ and aldohexoses with the general formula $CHO-(CHOH)_4-CH_2OH$.

Although both protein and sugar hydrolysates may be formed with base under controlled conditions, chelation of metals can be effectively induced only by placing soluble metal compounds in acid hydrolysate solution and thereafter adding a base to the mixture to raise the pH. Thus, according to the present invention, if either the protein or sugar hydrolysate is formed with a base, it is preferred that the hydrolysate be made acidic so that the resulting mixture is clearly acid prior to adding a base thereto forming the chelate precipitate which is insoluble in neutral and alkaline solutions.

The chelates can obviously be administered in different ways. They may be given separately or mixed with the food of an animal. Since the chelates are not the sole nutritional elements it may be preferable to partially or completely hydrolyze a protein or carbohydrate source or a combination of both and then form a chelate. This source may also contain other nutrients. For example, soy meal is rich in protein but also contains fats an carbohydrates roughly in a 3:1.5:1 ratio. On the other hand, fish meal is rich in protein and contains some fat but little carbohydrate. However, the mere fact that soy meal or fish meal along with starch, molasses and the like are used as hydrolysis sources should not be construed to mean that pure protein or carbohydrate hydrolysates cannot be used. Moreover, the polyvalent metals may be administered separately or in combination. Such details can fluctuate and be readily determind by one having ordinary skill in the art. The ratio of hydrolyzed protein to carbohydrate is not critical as long as both are present and the optimum ratio may vary from animal to animal or depend upon the particular ligand used.

EXAMPLE I

A synergistic composition of single metal chelates primarily for use as animal dietary supplement was prepared as follows;

| | |
|---|---|
| Mix together: | |
| Hydrochloric Acid (37%) | 15 lbs. |
| Phosphoric Acid (73%) | 35 lbs. |
| heat acids to boiling and slowly add: | |
| Fish meal (70% protein) | 24 lbs. |
| when fish meal is hydrolyzed, gradually stir in: | |
| Iron Oxide (58% Fe) | 35 lbs. |

The iron will go into solution and oxygen will escape so that the resulting solution includes protein hydrolysate and dissolved iron metal.

| | |
|---|---|
| Mix together: | |
| Starch | 100 lbs. |
| Fish meal (may be excluded) | 76 lbs. |
| Ammonium Hydroxide | 4 lbs. |

The starch in the mixture and the fish meal, if used, are hydrolyzed by the ammonium hydroxide, the starch being converted to a sugar hydrolysate. If desired, 10% solutions of sodium or potassium hydroxide may be substituted for the ammonium hydroxide.

the resulting sugar hydrolysate mixture is gradually combined with the protein hydrolysate mixture and the combination, which has a pH of about 2—3, is heated in a steamjacketed retort at 15 p.s.i. and 250° F. for one hour.

The resulting solution is thereafter removed from the retort and the pH is adjusted with ammonium hydroxide to a pH of about 5—7 or higher, to remove interfering protons. As the pH approaches neutral or becomes slightly basic, the synergistic chelated composition precipitates from solution.

In the treatment of animals for iron deficiency, it was found that 3 to 5 pounds of the synergistic chelated composition per ton of complete feed was an effective dose.

EXAMPLE II

A synergistic composition of multiple metal chelates was prepared as follows:

| | |
|---|---|
| Mix together: | |
| Hydrochloric Acid (37%) | 200 cc |
| Phosphoric Acid (73%) | 600 cc |
| heat acids to boiling and slowly add: | |
| Starch | 320 gms. |
| Honey | 500 gms. |
| when sugar hydrolysate has formed, slowly add: | |
| Magnesium Oxide (58% Mg) | 85 gms. |
| Copper Oxide (71% Cu) | 4 gms. |
| Manganese Oxide (60% Mn) | 8 gms. |
| Zinc Oxide (80% Zn) | 6 gms. |
| Iron Oxide (58% Fe) | 42 gms. |
| Potassium Carbonate (56% K) | 90 gms. |
| Potassium Iodide (76% $I_2$) | 108 gms. |
| In separate container mix together: | |
| Isolated soybean meal (90% protein) | 2000 gms. |
| Potassium Hydroxide solution (25%) | 2000 cc |

Heat the potassium hydroxide solution to thoroughly wet and hydrolyze soybean meal. Then mix the hydrolyzed soybean meal with the sugar hydrolysate solution above.

Add ammonium hydroxide until the pH of the solution approaches at least 7. The resulting precipitate is washed and dried at room temperature.

A daily dosage of 4 grams was found effective as a dietary supplement for human consumption. Each 4 gram dose provides the following amounts of metals:

TABLE 1

| Metal | Amount |
| --- | --- |
| Copper | 3 mg. |
| Iron | 30 mg. |
| Magnesium | 60 mg. |
| Manganese | 6 mg. |
| Potassium | 60 mg. |
| Zinc | 6 mg. |
| 0.1 mg. iodine is also provided. | |

The potassium was present in the mixture in a salt form and not as a chelate of hydrolyzed protein or carbohydrate.

EXAMPLE III

A synergistic composition of multiple metal chelates was prepared as follows:

| Mix together: | |
| --- | --- |
| Hydrochloric Acid (37%) | 30 lbs. |
| Phosphoric Acid (73%) | 200 lbs. |
| Feathers (85% protein) | 100 lbs. |

Bring acids to a boil and continue heating until protein hydrolysate is formed. Then add:

| | |
| --- | --- |
| Potassium Chloride (52% K) | 40.0 lbs. |
| Copper Oxide (71% Cu) | 1.25 lbs. |
| Iron Oxide (58% Fe) | 28.0 lbs. |
| Manganese Oxide (62% Mn) | 3.5 lbs. |
| Zinc Oxide (80% Zn) | 5.1 lbs. |
| Manganesium Oxide (58% Mg) | 155.0 lbs. |
| In a separate container mix: | |
| Carbohydrate | 1500 lbs. |
| Calcium Oxide (quicklime) | 100 lbs. |
| Potassium Hydroxide solution (25%) | 10 gal. |

The solution is allowed to boil for about one half hour. Normally, the slaking of the quicklime creates sufficient heat to maintain the mixture at the boiling point. The resulting polysaccharide hydrolysate solution is then combined with the metal-protein hydrolysate solution and 200 lbs. of Dolomite (5% Mg, 11% Ca) is added to the combination. Add ammonium hydroxide until the pH of the solution approaches 7.

The finished product will assay as indicated in Table 2:

TABLE 2

| | |
| --- | --- |
| $P_2O_5$ | 7.0% |
| N | 5.0% |
| K | 0.2% |
| Ca | 5.0% |
| Mg | 5.0% |
| Cu | 0.05% |
| Fe | 0.80% |
| Mn | 0.10% |
| Zn | 0.20% |

The potassium is present in salt form and not as a chelate.

EXAMPLE IV (1) Hydrolyzed protein-metal chelate was prepared by mixing:

| Ingredient | Amount in lbs. |
| --- | --- |
| Soybean Meal | 80.00 |
| Phosphoric Acid (75% $P_2O_5$) | 20.00 |
| Hydrochloric Acid (37%) | 15.00 |
| Magnesium Oxide (58% Mg) | 8.7 |
| Copper Oxide (71% Cu) | 0.705 |
| Iron Oxide (58% Fe) | 1.38 |
| Manganese Oxide (60% Mn) | 0.168 |
| Zinc Oxide (90% Zn) | 0.25 |

After the listed ingredients have been thoroughly mixed, they were allowed to stand until the protein in the soybean meal was hydrolyzed. Thereafter, 300 lbs. potassium hydroxide (65% K) was added and the pH was adjusted with ammonium hydroxide, quantity sufficient, to approximately pH 6.5. The product was then dried to 5% moisture. The resulting hydrolyzed protein-metal chelate had the metal assay set forth in Table 3.

TABLE 3

| Metal | % Composition |
| --- | --- |
| Mg | 5.0% |
| Cu | 0.05% |
| Fe | 0.80% |
| Mn | 0.10% |
| Zn | 0.20% |

(2) Hydrolyzed sugar-metal chelate was prepared by mixing:

| Ingredient | Amount in lbs. |
| --- | --- |
| Starch (as potato waste 80% solids) | 100 |
| Phosphoric Acid (75% $P_2O_5$) | 20 |
| Hydrochloric Acid (37%) | 15 |
| Magnesium Oxide (58% Mg) | 8.7 |
| Copper Oxide (71% Cu) | 0.705 |
| Iron Oxide (58% Fe) | 1.138 |
| Manganese Oxide (60% Mn) | 0.168 |
| Zinc Oxide (90% Zn) | 0.25 |

After the listed ingredients have been thoroughly mixed, they were allowed to stand until the starch in the potato waste was hydrolyzed. Thereafter, 300 lbs. potassium hydroxide (65% K) was added and the pH was adjusted with ammonium hydroxide, quantity sufficient, to approximately pH 6.5. The product was then dried to 5% moisture. The resulting hydrolyzed sugar-metal chelate had the metal assay set forth in Table 4.

TABLE 4

| Metal | % Composition |
| --- | --- |
| Mg | 5.0% |
| Cu | 0.05% |
| Fe | 0.80% |
| Mn | 0.10% |
| Zn | 0.20% |

A synergistic composition was prepared by mixing the products formed by steps (1) and (2).

The following examples illustrate the surprising growth rate and improved metal assimilation resulting from treating biological organisms with a synergistic composition of metal proteinates and sugar chelates as compared to the components of the synergistic composition individually, i.e., metal proteinate as sugar chelate alone and untreated control samples.

EXAMPLE V 1. 100 baby chicks were divided into four groups, numbered 1 through 4, the average weight of the chicks in the group was 37 grams. The chicks were fed a standard commercial chick starter ration. The starter ration had the composition set forth in Table 5.

TABLE 5

Soybean Meal
Meat Meal
Ground Corn
Ground Milo
Salt
Fat
Dicalcium Carbonate
Limestone
Ray Ewing Trace Mineral Mix (inorganic)

The chick starter ration assayed 22% protein and 0.01% fat and had a metabolizable caloric content of 1250 calories per pound.

2. The synergistic composition prepared as described in Example IV, was added to the commercial starter ration in an amount equal to 2% of the starter ration and administered to the chicks ad libitum to group 1.

3. The hydrolyzed protein-metal composition prepared according to step (1) of Example IV was added to the commerical chick ration in an amount equal to 2% of the starter ration and administered ad libitum to group 2.

4. The hydrolyzed sugar-metal composition prepared according to step (2) of Example IV was added to commercial chick ration in an amount equal to 2% of the starter ration and administered ad libitum to group 3.

5. The remaining 25 chicks were maintained on commercial ration ad libitum and were fed no mineral supplement so as to serve as control group 4.

After 21 days, the rate of growth of the chicks in each of the four groups was tabulated and is set forth in Table 6 below.

TABLE 6

| Group | Average Growth Rate (gms/day) |
|---|---|
| 1 | 15.3 |
| 2 | 11.0 |
| 3 | 11.5 |
| 4 | 6.1 |

Five birds from each of the four groups were chosen at random and sacrificed. The gizzard and entire alimentary canal were removed and discarded. The balance of the birds were digested in a mixture of nitric and perchloracetic acids. 100 cc aliquots of each volume of digest liquor was taken an diluted and assayed for mineral composition with an atomic absorption spectrophotometer. The results of the assay expressed in mg. % is set forth in Table 7 below.

TABLE 7

| Group | Fe | Mg | Cu | Mn | Co | Zn | Ca |
|---|---|---|---|---|---|---|---|
| 1 | 15.2 | 47 | 0.2 | 1.2 | 0 | 7.6 | 505 |
| 2 | 8.8 | 30 | 9.0 | 0 | 0 | 1.6 | 60 |
| 3 | 9.1 | 52 | 0.1 | 0 | 0 | 0.7 | 170 |
| 4 | 9.9 | 21 | 0.0 | 0.2 | 0 | 0.7 | 205 |

EXAMPLE VI

In order to demonstrate the assimilability of the metal chelates relative to corresponding inorganic metal salts, a tissue transport technique was used to measure the amount of metal assimilated by biological tissue.

1. Kreb's sodium bicarbonate buffer solution was prepared.

2. Composition #1 was prepared by producing a synergistic composition according to the method of Example I. The chelate was weighed into a 30 mg. sample and 5 mgs. of thermolysin was added to the sample and the sample was diluted to 25 milliliters (ml) with Kreb's solution.

3. Compositions 2 and 3 were prepared by producing chelate samples according to the methods of Examples II and III, respectively, and each sample was treated as in composition 1 above.

4. Inorganic mineral compositions in the form of oxides, sulfates and carbonates were obtained, each composition having copper, magnesium, iron and zinc concentrations generally corresponding to the concentrations of the same metals in compositions 1, 2 and 3 above. Each of the inorganic oxide, sulfate and carbonate compositions was likewise treated with 5 mgs. thermolysin and diluted to 25 ml samples.

5. Each of the samples was incubated at 37° C. for 2 hours and, thereafter, heated to 60° C. for 5 minutes to destroy the thermolysin. Thereafter, the samples were placed in an incubator at 37° C. and agitated with an automatic shaker.

6. A test animal was sacrificed, the gut removed and the duodenum discarded. The jejunum was invaginated and quickly immersed in Kreb's solution and cooled.

7. The invaginated jejunum was cut into segments having a length of 2 cm. and each placed in 100 ml Kreb's solution. Oxygen and carbon dioxide were bubbled through the solution.

8. A single segment was placed into each of the 25 ml samples of the organic and inorganic compositions for precisely one minute. Oxygen and carbon dioxide were bubbled through the samples during the one-minute period.

9. After the expiration of the one-minute time interval, the tissue segment was removed and rinsed ten separate times with Kreb's solution and placed on aluminum tares and dried overnight at 200° F.

10. Each of the tissues was assayed for mineral content with an atomic absorption spectrophotometer, as was a tissue segment treated precisely as above described with the exception that the control tissue was not exposed to mineral composition of any type. The amount of assimilation of metal by each of the tissues is set forth in Table 8 below.

TABLE 8

| | comp #1 | comp #2 | Comp #3 | Sulfate | Oxide | Carbonate | Control |
|---|---|---|---|---|---|---|---|
| Cu | 32.9 mg % | 35.4 mg % | 17.3 mg % | 8.3 mg % | 10.5 mg % | 6.1 mg % | trace mg % |
| Mg | 93.8 | 57.4 | 52.4 | 36.1 | 31.4 | 33.2 | 6.6 |
| Fe | 298.2 | 130.3 | ;11 80.1 | 77.6 | 60.7 | 67.5 | 22.9 |
| Zn | 191.0 | 191.0 | 126.3 | 84.4 | 65.8 | 72.4 | 13.5 |

EXAMPLE VII

Another novel process for preparing a synergistic composition is set forth in this Example. Although a variety of metals may be chelated in the hereafter described electrolytic process, this Example will illustrate the formation of synergistic copper composition:

Preparation of the Electrodes 1. 1 of copper bearing ore is pulverized into fine powder and placed in a 1000 cc flask with 500 cc distilled water.

2. 10% w/w/ ammonium carbonate is added to the flask, the ammonium carbonate functioning as an electrolyte. Other weak electrolytes, such as potassium iodide, could also be used; however, strong electrolytes, such as sodium chloride, should not be used.

3. Six zinc plates and one copper plate each weighing 15 grams are placed into the liquid in the flask. An electrical wire connects the zinc and copper plates to a 6-volt D.C. power source. The copper plate serves as the anode and the zinc plates as cathodes so that copper in the ore is precipitated through electrical deposition onto the zinc plates. Depending on the amount of copper in the ore, it is not uncommon to obtain as much as 200 to 500 milligrams copper on each zinc plate.

Preparation of the Hydrolysates 4. 60 grams of fish meal and 60 grams of corn starch are mixed together and wetted with 10% w/v distilled water.

5. Thereafter, sulfuric acid is added to the fish-starch mixture until the acid concentration is 5% w/v.

6. The mixture is slowly agitated while posphoric acid (75%) is slowly added to the mixture until a 20% w/v concentrationis obtained.

7. The acid mixture is subjected to 240 F. temperature for about 1 hour at 15 p.s.i. steam pressure in a retort until protein and sugar hydrolysates are formed.

Chelation

8. After the mixture is cooled, the electrodes prepared in the electrolytic cell, above described, are placed into the mixture and electrical current is reversed through the electrodes so that the copper molecules of the zinc electrodes are carrried into the hydrolysate mixture.

9. When the electrodes are free of copper, the electrodes are removed from the mixture and the hydrolysate is gently agitated and neutralized with a 2% dolomite and ammonium hydroxide solution to a pH of about 7 or above. As the pH is raised, the free copper in the hydrolysate mixture is chelated and precipitated from solution.

If desired, the metal ore used in the preparation of the elctrodes may be substituted with waste liquor resulting from ore processing or, if desired, a 10% solution of copper as copper sulfate can be used. Also, although zinc is a preferred metal for use as a cathode, other suitable cathode metals could be used.

EXAMPLE VIII

The following example illustrates a commercial type of synergistic hydrolyzed protein-sugar chelate combination, (a) 1060 grams of $MnCO_3$ were dissolved in 1500 mls of 37% HCl.

(b) 475 grams of ZnO here dissolved in 949 mls of 37% HCl.

(c) 1135 grams of $FeSO_4 \cdot 7H_2O$ were dissolved in 700 mls of 37% HCl.

(d) 203 grams of $CuCO_3$ were dissolved in 324 mls of 37% HCl.

Into a separate container 1400 mls of 75% phosphoric acid was added to 25 pounds of water and the solution was brought to a boil. Powdered gelatin was slowly added to the boiling aqueous acid and the boiling continued for 30 minutes to allow the gelating to hydrolyze.

The dissolved minerals were stirred to the gelatin hydrolysate and 10 pounds of black strap molasses was added as a source of carbohydrate.

Ten pounds of sodium meta silicate were added to the mixture.

The mixed gelatin hydrolysate, molasses chelate was precipitated out onto 15 pounds of soy meal which was added as a carrier. The mixture was drained and allowed to dry before packaging and shipping to the end user for animal consumption.

For example, typical protein sources that may be subjected to partial or complete hydrolysis include soy meal, fish meal, feathers, hair, animal tissues, gelatin and casein. These products may be pure protein or may contain "Impurities" in the form of fats, carbohydrates, hormones, vitamins, some mineral and the like. Similarly carbohydrate sources may include starches, glycogen, honey, molasses, and tri- and disaccharides such as raffinose, sucrose, lactose and maltose. Again the hydrolysis may be partial or complete. The degree of hydrolysis may vary according to the end use. For example, one may prefer ligands of poly-, tri- or disaccharides and polypeptides or peptides in preference to simple sugars and naturally occurring amino acids. Also, any mixture of the above may be used as the ligand source and one or more polyvalent metals may be used as the metal source.

The simple fact remains that the product utilized and administered to the living organism must be a chelate mixture of at least one essential polyvalent metal having both protein hydrolysate ligands and hydrolyzed carbohydrate ligands. The methods of hydrolysis of proteins and carbohydrates are known. Acids, bases and enzymes have long been used to produce hydrolysis products. However, the particular manner in which the synergistic mixture is formed is believed to be novel.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A composition of matter for improving biological development by increasing the availability of essential polyvalent metals in readily assimilable form to the cells of an animal organism comprising effective amounts of (1) a metal chelate with ligands consisting of the polypeptides, peptides and naturally occurring amino acids and (2) a metal chelate with ligands consisting of hydrolyzed carbohydrates.

2. A composition of matter according to claim 1 wherein the metals are selected from the group consisting of calcium, magnesium, zinc, iron, manganese, copper and cobalt.

3. A composition of matter according to claim 2 wherein the polypeptides, peptides and naturally occurring amino acids are derived from a protein source selected from the group consisting of soy meal, fish meal, feathers, hair, gelatin, animal tissue and casein.

4. A composition of matter according to claim 2 wherein the carbohydrate hydrolysate is derived from a carbohydrate source selected from the group consisting of starch, honey, molasses, glycogen, sucrose, maltose, lactose and raffinose.

5. A composition of matter according to claim 3 wherein the protein source is a soy meal.

6. A method of making the composition of matter of claim 2 comprising the steps of:
   (a) forming a soluble protein hydrolysate and adding soluble polyvalent metal salt thereto;
   (b) forming a soluble sugar hydrolysate and mixing the sugar hydrolysate with the soluble protein hydrolysate and soluble metal salt mixture; and
   (c) adding a basic solution to the soluble mixture to remove interfering protons causing the protein and carbohydrate hydrolysates to react with the metal ions formed from disassociation of the salt thereby precipitating as insoluble coordination complexes a synergistic chelated mixture having both protein hydrolysate and carbohydrate hydrolysate ligands.

7. A process according to claim 6 for forming a composition of matter wherein the protein source is feathers and the carbohydrate source is starch which comprises the steps of
   (a) hydrolyzing protein in feathers by mixing the feathers with a sufficient quantity of acid solution to dissolve the feathers and thereafter heating the mixture substantially until all of the protein in the feathers is hydrolyzed, adding, thereafter, at least one soluble polyvalent metal salt;
   (b) hydrolyzing starch in a separate container by mixing calcium oxide and a strong base solution and, thereafter, adding the starch so that the heat generated by the slaking of the calcium oxide will be sufficient to substantially hydrolyze the starch;
   (c) mixing the hydrolyzed protein and hydrolyzed starch in such proportion and adjusting the pH such that the final mixture is distinctly acid; and
   (d) increasing the pH of the mixture with a base to remove interfering protons thereby forming a mixture of hydrolyzed protein-metal chelates and hydrolyzed sugar-metal chelates.

8. A process according to claim 6 for forming a composition of matter comprising the steps of:
   (a) hydrolyzing protein with acid solution until a soluble protein hydrolysate results, combining at least one polyvalent metal ion to the protein hydrolysate and thereafter increasing the pH of the solution to remove interfering protons to form a hydrolyzed protein-metal chelate;
   (b) obtaining a sugar hydrolysate, combining at least one polyvalent metal ion to the sugar hydrolysate and thereafter increasing the pH of the solution to remove interfering protons so as to form a sugar-metal chelate; and
   (c) mixing the hydrolyzed protein-metal chelate with the sugar-metal chelate.

9. A process according to claim 6 for forming a composition of matter comprising the steps of:
   (a) hydrolyzing protein with acid solution to form a soluble protein hydrolysate and forming a sugar hydrolysate by adding acid solution to a polysaccharide;
   (b) combining the soluble hydrolyzed protein and hydrolyzed sugar with soluble polyvalent metal ions; and
   (c) thereafter incrementally increasing the pH of the resulting mixture thereby removing interfering protons until both hydrolyzed protein-metal chelates and sugar-metal chelates are formed.

10. A composition for animal nutrition prepared by:
    (a) hydrolyzing protein to form a soluble protein hydrolysate consisting of polypeptides, peptides and naturally occurring amino acids;
    (b) hydrolyzing polysaccharides to form a soluble sugar hydrolysate which hydrolysate is at least a simple sugar;
    (c) mixing the soluble protein hydrolysate and soluble sugar hydrolysate together;
    (d) adding one or more soluble polyvalent metal ions selected from the group consisting of iron, magnesium, copper, manganese, calcium, zinc and cobalt to the soluble protein hydrolysate and soluble sugar hydrolysate; and
    (e) adjusting the pH of the mixture with an alkaline solution to remove interfering protons and thereby precipitating a chelate which chelate is a cyclic metal coordination complex of said metal ions with the protein and sugar hydrolysates.

* * * * *